United States Patent [19]

Togawa et al.

[11] 4,444,835

[45] Apr. 24, 1984

[54] MAGNETIC RECORDING MEDIUM

[75] Inventors: Fumio Togawa, Ohtsu; Shigeo Aoyama, Ibaraki, both of Japan

[73] Assignee: Hitachi Maxell, Ltd., Osaka, Japan

[21] Appl. No.: 422,139

[22] Filed: Sep. 23, 1982

[30] Foreign Application Priority Data

Sep. 24, 1981 [JP] Japan ................. 56-151469

[51] Int. Cl.$^3$ ............................................. H01F 10/02
[52] U.S. Cl. ................... 428/329; 428/328; 428/403; 428/457; 428/694; 428/900
[58] Field of Search ............... 428/694, 900, 328, 329, 428/403, 457

[56] References Cited

U.S. PATENT DOCUMENTS

| | | | |
|---|---|---|---|
| 4,125,474 | 11/1978 | Dezawa et al. ................. | 252/62.62 |
| 4,237,506 | 12/1980 | Manly ................. | 360/135 |
| 4,302,523 | 11/1981 | Audran et al. ................. | 428/328 |
| 4,303,699 | 12/1981 | Tamura ................. | 427/132 |
| 4,315,052 | 2/1982 | Takahashi et al. ................. | 428/328 |
| 4,337,288 | 6/1982 | Takenaka et al. ................. | 428/328 |

*Primary Examiner*—Bernard D. Pianalto
*Attorney, Agent, or Firm*—Birch, Stewart, Kolasch & Birch

[57] ABSTRACT

A magnetic recording medium suitable for high-density recording, which comprises a magnetic layer containing uniaxial anisotropic, acicular iron oxide particles having a particle size of not more than 0.3$\mu$, with a surface layer containing a major amount of cobalt being formed on seeds of the magnetic particles, said magnetic recording medium having a residual magnetic flux density both in a vertical direction and in a horizontal or longitudinal direction of not less than 1000 gauss.

2 Claims, No Drawings

MAGNETIC RECORDING MEDIUM

The present invention relates to a magnetic recording medium, particularly a magnetic recording medium suitable for high-density recording.

Generally, the magnetic characteristics of magnetic recording media such as magnetic tapes are improved by orienting acicular magnetic particles in the magnetic layer along the longitudinal direction of magnetic tapes, and the like. But, with such media having acicular magnetic particles oriented in the longitudinal direction, because of magnetization in the longitudinal direction being used, there is a limit to the improvement in recording density. Consequently, with an increase in the recording density of signals, the diamagnetic field in the magnetic recording media increases to cause the attenuation and rotation of remanent magnetization whereby the detection of recording signals becomes difficult.

For this reason, magnetic cobalt-containing iron oxide particles having characteristics suitable for vertical magnetic recording have been tried as a recording element without being oriented longitudinally. For example, in the magnetic recording media such as magnetic discs, a method is employed in which uniaxially anisotropic, acicular magnetic cobalt-containing iron oxide particles are incorporated in the magnetic layer without being oriented.

However, the magnetic cobalt-containing iron oxide particles incorporated in the magnetic layer of the magnetic recording media such as magnetic discs, generally have a particle size as large as about $0.4\mu$, and also they are merely oriented randomly (not longitudinally) within the horizontal plane without any consideration about vertical orientation. For this reason, there are defects such that the vertical magnetization is not sufficient and short wavelengths such as a recording wavelength of not more than $1\mu$ can not be recorded sufficiently, and therefore high-density recording can not be achieved satisfactorily.

In view of these situations, the present inventors have extensively studied, and as a result, it has been found that, by using as magnetic particles to be incorporated into the magnetic layer uniaxial anisotropic, acicular magnetic particles having a particle size of not more than $0.3\mu$ comprising magnetic iron oxide particles, which are a seed, covered with a surface layer containing a major amount of cobalt, and making the residual magnetic flux density in both the vertical direction and the longitudinal direction of the magnetic layer containing the magnetic particles not less than 1000 gauss, the vertical magnetization of the magnetic layer becomes sufficiently good to result in a great improvement in the recording characteristics in the high-density region, whereby there can be obtained a magnetic recording medium which is satisfactorily used for recording at a short wavelength, such as a recording wavelength of not more than $1\mu$, as well as at a long wavelength.

The magnetic cobalt-containing iron oxide particles used in the present invention are preferably acicular magnetic iron oxide particles of uniaxial anisotropy and of not more than $0.3\mu$ in particle size which contain a surface layer containing a major amount of cobalt on the seeds of magnetic iron oxide particles. When the particle size is larger than $0.3\mu$, the surface smoothness of the magnetic tapes becomes unfavorably poor. The cobalt content is preferably in the range of 2 to 15% by weight based on the total weight of the magnetic particles. The magnetic cobalt-containing iron oxide particles show little degradation of the magnetization by heating and pressure as compared with particles containing uniformly doped cobalt atoms, and is particularly suitable for the present invention which uses fine particles of not more than $0.3\mu$ in particle size.

Such magnetic acicular cobalt-containing iron oxide particles of uniaxial anisotropy and of not more than $0.3\mu$ in particle size which contain a surface layer containing a major amount of cobalt on the seeds of the particles are gravure-coated onto substrates together with a binding agent and the like. For the purpose of preventing the magnetic particles from orienting just any direction of three dimensions, a conventional magnetic smoothing method may be applied. That is, a paint composition prepared by using the magnetic particles is applied to a substrate film by a conventional coating method, e.g. gravure coating, reverse roll coating, and a magnetic field is charged thereto, by which the paint composition applied onto the substrate is temporarily retained around the magnetic field, and thereafter, a magnetic layer having a smooth surface is formed. After the surface-smoothing treatment, the coated substrate having a magnetic layer containing partly oriented magnetic particles is treated in a counter magnetic field of 1,000 to 10,000 gauss, preferably 2,000 to 3,000 gauss, and then dried to prepare a three-dimensionally non-oriented tape. It is preferred for the magnetic layer thus obtained to have a residual magnetic flux density of not less than 1000 gauss in both the vertical and longitudinal (horizontal) directions thereof. When the residual magnetic flux density in the vertical direction is less than 1000 gauss, output at the short wavelength side in the recording-reproducing of magnetic tapes is small, and further when that in the longitudinal direction is less than 1000 gauss, output at the long wavelength side is small.

As described above, when a magnetic layer is formed by coating the foregoing magnetic cobalt-containing iron oxide particles onto substrates together with binder resins, organic solvents and other conventional additives, followed by drying, and when the residual magnetic flux densities in both the vertical and longitudinal directions of the magnetic layer are controlled so as not to be less than 1000 gauss, the vertical magnetization becomes sufficiently good to result in an improvement in the recording characteristics in the high-density region, whereby there is obtained a magnetic recording medium which can satisfactorily be used for recording at short wavelengths, such as a recording wavelength of not more than $1\mu$, as well as at long wavelength.

The binder resin used herein includes the conventional binder resins such as vinyl chloride/vinyl acetate copolymers, polyvinyl butyral, polyurethane resins, nitrocellulose and the like. The organic solvent includes conventional organic solvents such as toluene, methyl isobutyl ketone, methyl ethyl ketone, cyclohexanone, tetrahydrofuran, ethyl acetate and the like, which may be used alone or in combination of two or more of them.

Further, the commonly used various additives such as dispersing agents, lubricating agent, polishing agents, antistatic agents and the like may optionally be incorporated in the magnetic paint composition.

The present invention will be illustrated with reference to the following examples, but should not be construed to be limited thereto.

EXAMPLE 1

γ-Fe$_2$O$_3$ (particle size (long axis): 0.15μ and axial ratio (long axis/short axis): 8, 900 g) is dispersed in water (6 liters) and thereto are added and dissolved cobalt sulfate (258 g) and ferrous sulfate (766 g), and thereto is added a solution of sodium hydroxide (1014 g) in water (3 liter), followed by reaction at 45° C. for 6 hours. After the reaction, the resulting magnetic cobalt-containing iron oxide particles are filtered, washed with water and dried to obtain uniaxial anisotropic, acicular particles having cobalt content: 4.9% by weight, coercive force (Hc): 910 oersted, maximum magnetization (σs): 77 emu/g, and squareness ratio (σr/σs): 0.49.

Using the magnetic cobalt-containing iron oxide particles thus obtained, a magnetic paint composition is prepared by mixing and dispersing the ingredients in the following formulation by means of a ball mill for 3 days.

| Ingredients | Parts by weight |
| --- | --- |
| Co-containing γ-Fe$_2$O$_3$ particles | 750 |
| VAGH (vinyl chloride/vinyl acetate/vinyl alcohol copolymer, manufactured by U.C.C. in USA) | 125 |
| Pandex T-5250 (urethane elastomer, manufactured by Dainippon Ink Co.) | 100 |
| Coronate L (trifunctional low molecular weight isocyanate compound, manufactured by Nippon Polyurethane Kogyo Co.) | 25 |
| n-Butyl stearate | 15 |
| Methyl isobutyl ketone | 600 |
| Toluene | 600 |

This magnetic paint composition is gravure-coated onto a polyester base film of 12μ in thickness. Thereafter, paint film-smoothing treatment is applied to the film by the magnetic smoothing method, and the film is then dried so as to prevent orientation of the magnetic particles by treatment in a counter magnetic field of counter pole of 3000 gauss. Thus, a magnetic layer of 3μ in dry thickness is formed. Thereafter, surface treatment is applied to the formed magnetic layer, and then, the product is cut in a pre-determined width to prepare a magnetic tape.

EXAMPLE 2

In the same manner as described in Example 1 except that γ-Fe$_2$O$_3$ particles (particle size (long axis): 0.2μ, axial ratio (long axis/short axis): 8) are used as the starting material, there are obtained uniaxially anisotropic, acicular magnetic cobalt-containing iron oxide particles having cobalt content: 4.9% by weight, coercive force (Hc): 900 oersted, maximum magnetization (σs): 76.8 emu/g and squareness ratio (σr/σs): 0.49.

By using the magnetic cobalt-containing iron oxide particles, a magnetic tape is prepared in the same manner as in Example 1.

EXAMPLE 3

In the same manner as in Example 1 except that γ-Fe$_2$O$_3$ particles (particle size (long axis): 0.3μ, axial ratio (long axis/short axis): 8) are used as the starting material, there are obtained uniaxially anisotropic, acicular magnetic cobalt-containing iron oxide particles having cobalt content: 4.9% by weight, coercive force (Hc): 950 oersted, maximum magnetization (σs): 77.5 emu/g and squareness ratio (σr/σs): 0.49.

By using the magnetic cobalt-containing iron oxide particles, a magnetic tape is prepared in the same manner as in Example 1.

EXAMPLE 4

In the same manner as in Example 1 except that γ-Fe$_2$O$_3$ particles (particle size (long axis): 0.15μ, axial ratio (long axis/short axis): 5) are used as the starting material, there are obtained uniaxially anisotropic, acicular magnetic cobalt-containing iron oxide particles having cobalt content: 4.9% by weight, coercive force (Hc): 910 oersted, maximum magnetization (σs): 77.5 emu/g and squareness ratio (σr/σs): 0.49.

By using the magnetic cobalt-containing iron oxide particles, a magnetic tape is prepared in the same manner as in Example 1.

EXAMPLE 5

In the same manner as in Example 1 except that γ-Fe$_2$O$_3$ particle (particle size (long axis): 0.15μ, axial ratio (long axis/short axis): 3.5) are used as a starting material, there are obtained uniaxially anisotropic, acicular magnetic cobalt-containing iron oxide particles having cobalt content: 4.9% by weight, coercive force (Hc): 850 oersted, maximum magnetization (σs): 77.3 emu/g and squareness ratio (σr/σs): 0.49.

By using the magnetic cobalt-containing iron oxide particles, a magnetic tape is prepared in the same manner as in Example 1.

REFERENCE EXAMPLE

In the same manner as in Example 1 except that γ-Fe$_2$O$_3$ particles (particle size (long axis): 0.4μ, axial ratio (long axis/short axis): 8) are used as a starting material, there are obtained uniaxial anisotropic, acicular magnetic cobalt-containing iron oxide particles having cobalt content: 4.9% by weight, coercive force (Hc): 930 oersted, maximum magnetization (σs): 77.1 emu/g, and squareness ratio (σr/σs): 0.50.

A magnetic tape is prepared in the same manner as in Example 1 except that the same amount of the magnetic cobalt-containing iron oxide particles thus obtained is used in place of the Co-containing γ-Fe$_2$O$_3$ particles incorporated in the magnetic paint composition, and that after applying gravure-coating, smoothing treatment is applied by contacting the paint film with a flexible sheet in place of non-orientation treatment of the magnetic particles.

The magnetic tapes obtained in Examples and Reference Example were measured for coercive force (Hc), residual magnetic flux density (Br), maximum magnetic flux density (Bs) and squareness ratio (Br/Bs) in the longitudinal direction, and coercive force (Hc), residual magnetic flux density (Br) and squareness ratio (Br/Bs) in the vertical direction. Also, maximum output level (M.O.L.) at various recording wavelengths was measured.

The results are shown in the following table.

TABLE

|  |  | Example 1 | Example 2 | Example 3 | Example 4 | Example 5 | Reference Example |
| --- | --- | --- | --- | --- | --- | --- | --- |
| Longitudinal direction x | Coercive force Hc(Oe) | 920 | 900 | 960 | 920 | 870 | 950 |
|  | Residual magnetic flux density Br (G) | 1070 | 1080 | 1115 | 1080 | 1085 | 1090 |
|  | Maximum magnetic flux density Bs (G) | 1950 | 2000 | 2030 | 1960 | 1940 | 1820 |
|  | Squareness ratio Br/Bs | 0.55 | 0.54 | 0.55 | 0.55 | 0.56 | 0.60 |
| Vertical direction | Coercive force Hc(Oe) | 920 | 910 | 960 | 930 | 870 | 650 |
|  | Residual magnetic flux density Br (G) | 1070 | 1100 | 1115 | 1100 | 1085 | 730 |
|  | Squareness ratio Br/Bs | 0.50 | 0.55 | 0.55 | 0.56 | 0.56 | 0.40 |
| Maximum output level M.O.L. (dB) | $5\mu$ wavelength | +0.5 | +0.6 | +0.4 | +0.3 | +0.6 | 0 |
|  | $1\mu$ wavelength | +2.0 | +1.8 | +1.6 | +1.8 | +1.3 | 0 |
|  | $0.75\mu$ wavelength | +3.5 | +3.1 | +2.8 | +3.2 | +2.5 | 0 |
|  | $0.5\mu$ wavelength | +5.4 | +4.8 | +3.9 | +5.0 | +3.3 | 0 |

As is apparent from the above table, either of the magnetic tapes obtained by the present invention (Examples 1 to 5), compared with the conventional magnetic tape (Reference Example), has larger coercive force, residual magnetic flux density and squareness ratio in the vertical direction, and its maximum output level is of the same degree at long wavelengths not less than $5\mu$ but larger at short ones not more than $1\mu$. It can be seen from this result that the magnetic recording medium obtained by the present invention is not only good in carrying out long wavelength recording but also particularly superior in carrying out short wavelength recording, i.e. high-density recording.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed:

1. A magnetic recording medium which comprises a magnetic layer containing uniaxial anisotropic, acicular magnetic iron oxide particles having a particle size of not more than $0.3\mu$, said particles having a surface layer containing a major amount of cobalt formed thereon, said particles being oriented both in a vertical and a horizontal direction such that the residual magnetic flux of said magnetic recording medium is not less than 1000 gauss in both said vertical direction and said horizontal direction.

2. A magnetic recording medium according to claim 1, wherein said magnetic iron oxide particles have a cobalt content of 2 to 15% by weight.

* * * * *